(12) United States Patent
Li et al.

(10) Patent No.: US 12,458,221 B2
(45) Date of Patent: Nov. 4, 2025

(54) TOMOGRAPHIC IMAGE PROCESSING DEVICE AND PROGRAM

(71) Applicant: Tomey Corporation, Nagoya (JP)

(72) Inventors: Fushi Li, Nagoya (JP); Keiichiro Okamoto, Nagoya (JP); Risa Higashita, Obu (JP)

(73) Assignee: Tomey Corporation, Nagoya (JP)

( * ) Notice: Subject to any disclaimer, the term of this patent is extended or adjusted under 35 U.S.C. 154(b) by 444 days.

(21) Appl. No.: 18/149,375

(22) Filed: Jan. 3, 2023

(65) Prior Publication Data

US 2023/0240526 A1 Aug. 3, 2023

(30) Foreign Application Priority Data

Jan. 31, 2022 (JP) .................................. 2022-013604

(51) Int. Cl.
  *A61B 3/10* (2006.01)
  *A61B 3/117* (2006.01)
  *A61B 3/00* (2006.01)

(52) U.S. Cl.
  CPC .............. *A61B 3/102* (2013.01); *A61B 3/117* (2013.01); *A61B 3/0041* (2013.01)

(58) Field of Classification Search
  CPC ........ A61B 3/0041; A61B 3/102; A61B 3/117
  See application file for complete search history.

(56) References Cited

U.S. PATENT DOCUMENTS

| 8,967,810 B1* | 3/2015 | Prager .................... A61B 3/117 351/246 |
| 10,123,691 B1* | 11/2018 | Bagherinia ............. G06T 7/149 |
| 2011/0299034 A1* | 12/2011 | Walsh .................... A61B 3/132 351/206 |

(Continued)

FOREIGN PATENT DOCUMENTS

| EP | 2865324 A1 | 4/2015 |
| EP | 3449810 A1 | 3/2019 |

(Continued)

OTHER PUBLICATIONS

The extended European search report issued by the European Patent Office on May 15, 2023, which corresponds to European Patent Application No. 23153408.2-1126 and is related to U.S. Appl. No. 18/149,375.

(Continued)

*Primary Examiner* — Nicholas R. Pasko
(74) *Attorney, Agent, or Firm* — Studebaker Brackett PLLC

(57) ABSTRACT

A tomographic image processing device includes a tomographic image acquisition unit that acquires a plurality of tomographic images including an anterior chamber angle, the tomographic images being obtained by radial scan with a substantially conical vertex as a center; an analysis unit that obtains an analysis value related to the anterior chamber angle from each of the plurality of tomographic images; and a display processing unit that causes a display unit to display information regarding each analysis value obtained from (Continued)

each of the plurality of tomographic images in association with a rotation angle in the radial scan at which the anterior chamber angle corresponding to the analysis value is obtained.

10 Claims, 10 Drawing Sheets
(5 of 10 Drawing Sheet(s) Filed in Color)

(56) References Cited

U.S. PATENT DOCUMENTS

| | | | |
|---|---|---|---|
| 2012/0140174 A1 | 6/2012 | Hee et al. | |
| 2013/0258280 A1* | 10/2013 | Goto | G06T 7/60 |
| | | | 351/246 |
| 2013/0258283 A1* | 10/2013 | Goto | A61B 3/14 |
| | | | 351/206 |
| 2015/0092160 A1* | 4/2015 | Chen | A61B 3/102 |
| | | | 351/206 |
| 2015/0150447 A1* | 6/2015 | Huang | A61B 3/102 |
| | | | 382/131 |
| 2017/0105617 A1* | 4/2017 | Li | A61B 3/103 |
| 2017/0135569 A1* | 5/2017 | Okamoto | A61B 3/0025 |
| 2018/0174296 A1* | 6/2018 | Okamoto | A61B 3/102 |

FOREIGN PATENT DOCUMENTS

| | | |
|---|---|---|
| JP | 2013-212176 A | 10/2013 |
| JP | 2015-043814 A | 3/2015 |
| JP | 2015-066083 A | 4/2015 |
| JP | 6263348 B2 | 1/2018 |
| JP | 2019-042304 A | 3/2019 |
| JP | 2020-069271 A | 5/2020 |
| JP | 2020-157041 A | 10/2020 |
| JP | 2021-062077 A | 4/2021 |
| WO | 2021/153087 A1 | 8/2021 |

OTHER PUBLICATIONS

An Office Action; "Notice of Reasons for Refusal," mailed by the Japanese Patent Office on Sep. 9, 2025, which corresponds to Japanese Patent Application No. 2022-013604 and is related to U.S. Appl. No. 18/149,375; with English language translation.

* cited by examiner

TOMOGRAPHIC IMAGE PROCESSING DEVICE AND PROGRAM

CROSS-REFERENCE TO RELATED APPLICATION

This application claims benefit of priority to Japanese Patent Application No. 2022-013604, filed Jan. 31, 2022, the entire content of which is incorporated herein by reference.

BACKGROUND

Technical Field

The present disclosure relates to a tomographic image processing device and a program.

Background Art

Conventionally, optical coherence tomography (OCT) that acquires a three-dimensional image based on a tomographic image of an eye to be examined is known. Japanese Patent Application Laid-Open No. 2015-43814 discloses a technique for evaluating the narrowness of a gap of an anterior chamber angle based on a tomographic image of an anterior eye segment.

SUMMARY

Conventionally, the narrowness of an anterior chamber angle has been evaluated based on a tomographic image of the anterior chamber angle at a certain position. However, the narrowness may differ depending on the position of the anterior chamber angle, and there is a possibility that the state of the anterior chamber angle of the eye to be examined cannot be accurately estimated only from the state of the anterior chamber angle at a certain position.

The present disclosure has been made in view of the above problems, and provides more effective information indicating a state of an anterior chamber angle of an eye to be examined.

Accordingly, the present disclosure relates to a tomographic image processing device including a tomographic image acquisition unit that acquires a plurality of tomographic images including an anterior chamber angle, the tomographic images being obtained by radial scan with a substantially corneal vertex as a center; an analysis unit that obtains an analysis value related to the anterior chamber angle from each of the plurality of tomographic images; and a display processing unit that causes a display unit to display information regarding each analysis value obtained from each of the plurality of tomographic images in association with a rotation angle in the radial scan at which the anterior chamber angle corresponding to the analysis value is obtained.

Another aspect of the present disclosure relates to a program for causing a computer to function as a tomographic image acquisition unit that acquires a plurality of tomographic images including an anterior chamber angle, the tomographic images being obtained by radial scan with a substantially corneal vertex as a center; an analysis unit that obtains an analysis value related to the anterior chamber angle from each of the plurality of tomographic images; and a display processing unit that causes a display unit to display information regarding each analysis value obtained from each of the plurality of tomographic images in association with a rotation angle in the radial scan at which the anterior chamber angle corresponding to the analysis value is obtained.

As described above, according to the present disclosure, the information regarding the analysis value obtained from the plurality of tomographic images having different scanning positions in the circumferential direction having the corneal vertex as the center is displayed on the display unit in association with the rotation angle in the circumferential direction. That is, more effective information indicating the state of the anterior chamber angle of the eye to be examined can be provided. Therefore, the user can grasp the state of the anterior chamber angle of the eye to be examined together with the relationship with the position of the anterior chamber angle.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
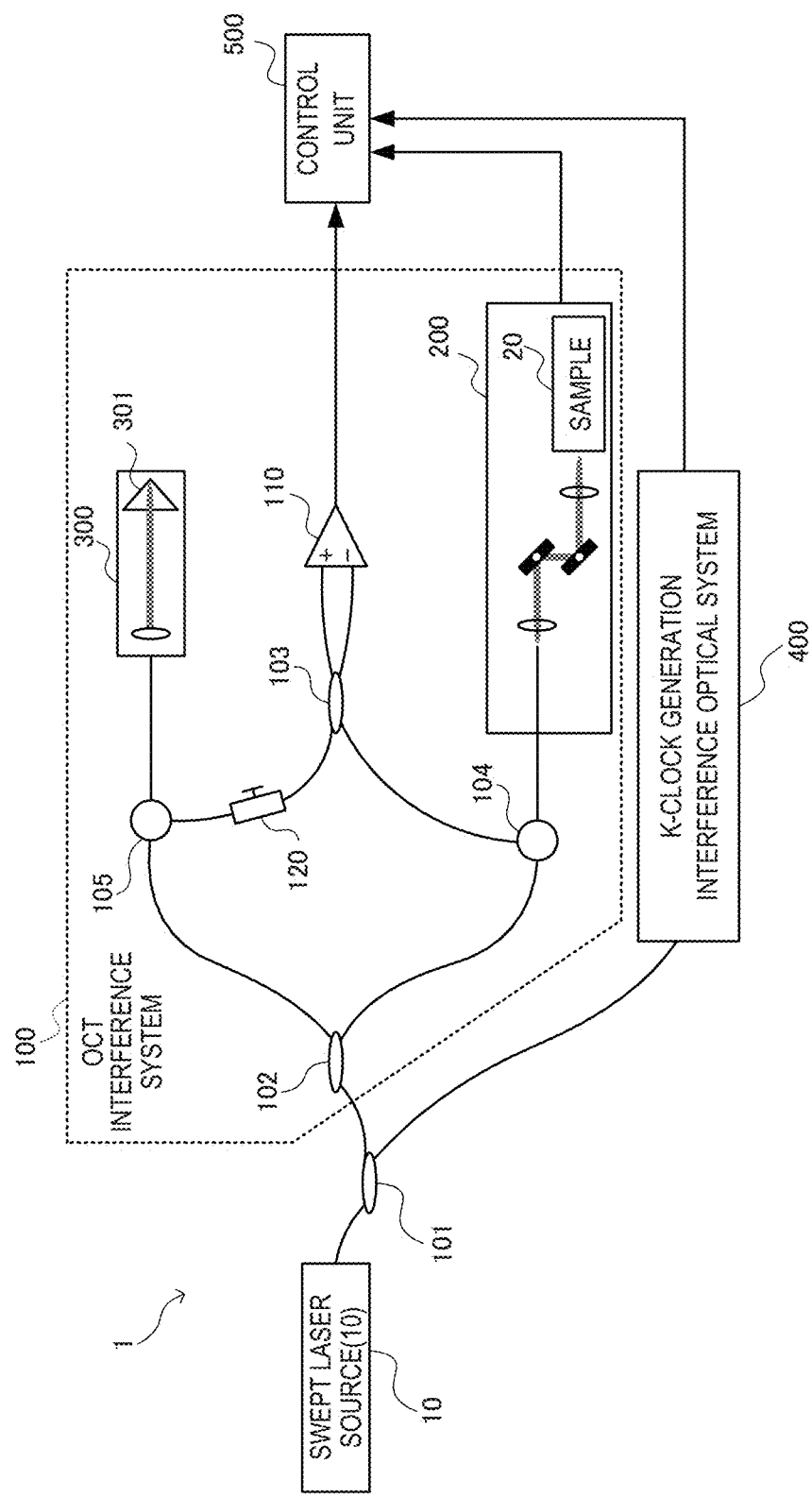
FIG. 1 is a configuration diagram of an ophthalmology device.

Hereinafter, the ophthalmology device 1 according to the present embodiment will be described. The ophthalmology device 1 is an optical coherence tomography device that obtains a tomographic image of the anterior eye segment of the eye to be examined through optical coherence tomography. FIG. 1 is an overall configuration diagram of an ophthalmology device 1. The ophthalmology device 1 mainly includes a swept laser source 10, a single mode fiber coupler (SMFC) 101, an OCT interference system 100, a k-clock generation interference optical system 400, and a control unit 500. Here, the control unit 500 is an example of a tomographic image processing device.

The OCT interference system 100 is an optical system for obtaining a tomographic image of the anterior eye segment of the eye to be examined through optical coherence tomography. In the present embodiment, an example in which SS-OCT (Swept Source-OCT) is adopted as the optical coherence tomography will be described. The swept laser source 10 is a light source that outputs light while scanning while temporally changing the wavelength. As the swept laser source 10, for example, a light source having performance capable of realizing high-speed scanning of greater than or equal to 50 KHz having a band of a center wavelength of greater than or equal to 1 μm and a sweeping width of greater than or equal to 70 nm is used. The light emitted from the swept laser source 10 is guided by an optical fiber such as a single mode fiber and used for tomographic image capturing of a sample 20 and also used for generation of a k-clock. The ophthalmology device 1 of the present embodiment photographs the anterior eye segment of the subject as the sample 20.

The light emitted from the swept laser source 10 is branched by the SMFC 101 and enters the OCT interference system 100 and the k-clock generation interference optical system 400.

The OCT interference system 100 includes SMFCs 102, 103, a measurement-side circulator 104, a reference-side circulator 105, a balanced detector 110, a polarization controller 120, a scanning-alignment optical system 200, and a reference optical system 300. One of the incident light branched by the SMFC 101 is further branched in the SMFC 102, the other light enters the scanning-alignment optical system 200, and the other light enters the reference optical system 300 side.

One light beam branched by the SMFC 102 enters the scanning-alignment optical system 200 through the measurement-side circulator 104. The measurement-side circulator 104 is an optical element disposed between the SMFC 102, the scanning-alignment optical system 200, and the SMFC 103. The scanning-alignment optical system 200 is an optical system that irradiates the sample 20 with incident light and guides reflected light from the sample 20 to the SMFC 103 through the measurement-side circulator 104. Details of the scanning-alignment optical system 200 will be described later with reference to FIG. 2.

The other light branched by the SMFC 102 enters the reference optical system 300 through the reference side circulator 105. The reference-side circulator 105 is an optical element disposed between the SMFC 102, the reference unit 301, and the SMFC 103. The reference optical system 300 is provided with a reference unit 301 that converts incident light into reference light. In the present embodiment, the reference unit 301 is a prism that emits incident light as reference light. The reference unit 301 is movably provided to match the optical path length of the scanning-alignment optical system 200 with the optical path length of the reference optical system 300 before measuring the sample 20. Note that the position of the reference unit 301 is fixed during the measurement of the sample 20.

The light that entered the reference optical system 300 becomes a reference light by the reference unit 301, and is guided to the SMFC 103 via the reference side circulator 105 and the polarization controller 120. The polarization controller 120 is an element that controls the polarization of the reference light guided from the reference optical system 300 to the SMFC 103. As the polarization controller 120, controllers of various modes such as an in-line type and a paddle type can be used.

The SMFC 103 synthesizes the reflected light guided from the scanning-alignment optical system 200 and the reference light guided from the reference optical system 300 to generate measurement interference light. In addition, the SMFC 103 branches the synthesized measurement interference light into two pieces of measurement interference lights having phases different by 180° and guides the same to the balanced detector 110.

The balanced detector 110 receives the measurement interference light and outputs a measurement interference signal. The measurement interference signal is input to the control unit 500. The control unit 500 generates a tomographic image of the sample 20 from the measurement interference signal by performing arithmetic processing.

Figure 2:
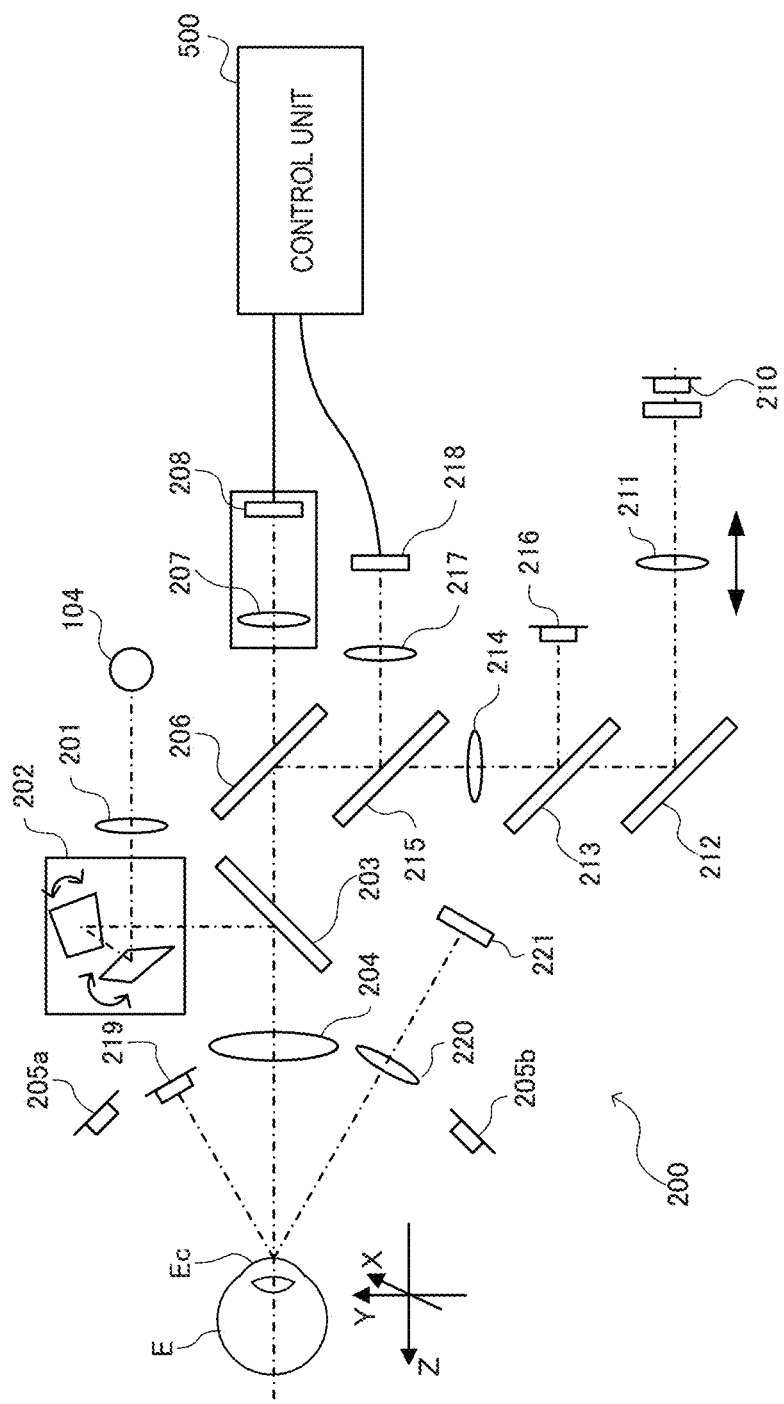
FIG. 2 is a view illustrating a scanning-alignment optical system.

FIG. 2 illustrates a configuration of the scanning-alignment optical system 200. The scanning-alignment optical system 200 includes a scanning optical system, an anterior eye segment capturing system, a fixation target optical system, and an alignment optical system.

The scanning optical system is an optical system for obtaining a tomographic image. In the scanning optical system, light from the measurement-side circulator 104 via the optical fiber enters a galvano-scanner 202 through a collimator lens 201. The galvano-scanner 202 is a device for scanning incident light, and is driven by a galvano driver (not illustrated). The light that has passed through the galvano-scanner 202 is reflected by a hot mirror 203 at an angle of 90°, and enters the eye to be examined E through an objective lens 204. The light that entered the eye to be examined E is reflected by each tissue portion (cornea, anterior chamber, iris, crystalline lens, etc.) of the anterior eye segment Ec and becomes measurement light. Then, the measurement light passes through the objective lens 204, the hot mirror 203, the galvano-scanner 202, and the collimator lens 201 in order contrary to the above, and is guided to the SMFC 103 via the measurement-side circulator 104.

In the SMFC 103, the reflected light (measurement light) from the anterior eye segment Ec and the reference light are multiplexed, and a signal thereof is input to the balanced detector 110. In the balanced detector 110, interference for each wavelength is measured, and a measured measurement interference signal is input to the control unit 500. The control unit 500 performs processes such as inverse Fourier transformation on the measurement interference signal to acquire a tomographic image of the anterior eye segment Ec along the scanning line.

The anterior eye segment capturing system is a capturing system for obtaining a two-dimensional image of the anterior eye segment. The anterior eye segment capturing system includes illumination light sources 205a and 205b, an objective lens 204, a hot mirror 203, a beam splitter 206, an image forming lens 207, and an area sensor 208. The illumination light sources 205a and 205b irradiate the front surface of the eye to be examined E with illumination light in a visible light region. The illumination light is reflected by the eye to be examined E, and the reflected light is guided to the area sensor 208 through the objective lens 204, the hot mirror 203, the beam splitter 206, and the image forming lens 207. As a result, a front image of the anterior eye segment of the eye to be examined E is photographed, and the photographed front image is input to the control unit 500. Here, the front image is a two-dimensional image of the anterior eye segment as viewed from the optical axis direction of the reflected light, and is an image in which the right and left of the subject are the right and left direction of the image, and the vertical direction of the subject is the vertical direction.

The fixation target optical system is an optical system for preventing the subject from moving the eyeball (eye to be examined E) as much as possible by looking at the fixation lamp. The fixation target optical system includes a fixation target light source 210, a variable focus movable lens 211, a cold mirror 212, a hot mirror 213, a relay lens 214, a beam splitter 215, a beam splitter 206, a hot mirror 203, and an objective lens 204. The emitted light from the fixation target light source 210 reaches the eye to be examined E via the variable focus movable lens 211, the cold mirror 212, the hot mirror 213, the relay lens 214, the beam splitter 215, the beam splitter 206, the hot mirror 203, and the objective lens 204 in this order.

Here, the variable focus movable lens 211 is configured to be movable so that the focus of the fixation target can be freely changed. For example, the variable focus movable lens 211 can be moved so that the fixation target comes into focus at the position of the refractive power value of the eye to be examined E, thereby enabling the subject to naturally view (a state in which no load is applied to the crystalline lens).

The alignment optical system is an optical system for aligning the eye to be examined E. Although not illustrated, the ophthalmology device 1 includes a device main body and a holding base that supports the device main body. On the front side (subject side) of the device main body, a jaw receiving portion on which the subject places the jaw and a forehead abutting portion to which the subject puts the forehead are fixedly provided. When the forehead is abutted on the forehead abutting portion, the eye of the subject (eye to be examined E) is arranged in front of the examination window provided on the front surface of the device main body.

Further, the device main body is supported so as to be movable in the X direction, the Y direction, and the Z direction with respect to the holding base. The device main body can move in the X direction, the Y direction, and the Z direction with respect to the holding base under the control of the control unit 500. Here, the X direction corresponds to the left-right direction of the device main body and corresponds to the left-right direction of the head of the subject fixed to the device. The Y direction corresponds to the vertical direction of the device main body and corresponds to the vertical direction of the subject fixed to the forehead abutting portion or the like. The Z direction corresponds to the depth direction of the device main body and corresponds to the front-back direction of the subject fixed to the forehead abutting portion or the like. In the examination of the eye to be examined E, the device main body needs to be moved so that the eye to be examined E is set at a predetermined position of the device main body, and the alignment optical system is an optical system for obtaining a movement amount of the device main body.

The alignment optical system includes an XY-direction position detection system and a Z-direction position detection system. The XY-direction position detection system is configured to detect a position in the XY-direction (shift in the vertical and horizontal directions with respect to the device main body) of the eye to be examined E (conical vertex). The Z-direction position detection system is configured to detect a position (deviation in the Z direction) in the front-back direction of the eye to be examined E (corneal vertex).

The XY-direction position detection system includes an XY position detection light source 216, a hot mirror 213, a relay lens 214, a beam splitter 215, a beam splitter 206, a hot mirror 203, an objective lens 204, an image forming lens 217, and a two-dimensional position sensor 218. The alignment light for position detection emitted from the XY position detection light source 216 reaches the anterior eye segment Ec (cornea) of the eye to be examined E via the hot mirror 213, the relay lens 214, the beam splitter 215, the beam splitter 206, the hot mirror 203, and the objective lens 204.

Since the corneal surface of the eye to be examined E is formed in a spherical shape, the alignment light is reflected by the corneal surface so as to form a bright spot image on the inner side of the corneal vertex of the eye to be examined E. The reflected light reflected by the corneal surface is guided to the objective lens 204. The reflected light from the corneal vertex is input to the two-dimensional position sensor 218 via the objective lens 204, the hot mirror 203, the beam splitter 206, the beam splitter 215, and the image forming lens 217. The two-dimensional position sensor 218 detects the position of the bright spot as the position of the corneal vertex (the position in the X direction and the Y direction).

A detection signal of the two-dimensional position sensor 218 is input to the control unit 500. In the present embodiment, in the control unit 500, the position where the corneal vertex is to be arranged is set in advance as the normal position in a state where the alignment between the two-dimensional position sensor 218 and the anterior eye segment capturing system is performed. The normal position of the conical vertex is a position to be followed at the time of tomographic image acquisition, and is, for example, the center position of the photographed image of the imaging element. The control unit 500 obtains the normal position and the position shift amount of the detected corneal vertex (bright spot) in the X direction and the Y direction based on the detection of the two-dimensional position sensor 218.

The Z-direction position detection system includes a Z-position detection light source 219, an image forming lens 220, and a line sensor 221. The Z position detection light source 219 irradiates the eye to be examined E with detection light (slit light or spot light) from an oblique direction. The irradiation light is reflected obliquely by the cornea, and the reflected light is guided to the line sensor 221 through the image forming lens 220. Since the incident position of the reflected light incident on the line sensor 221 differs depending on the position in the front-back direction (Z-direction) of the eye to be examined E, the Z-direction position of the eye to be examined E is detected.

The control unit 500 moves the device main body with respect to the holding base so that the position shift amounts in the X direction and the Y direction of the corneal vertex (bright spot) detected by the XY-direction position detection system and the position shift amount of the eye to be examined E detected by the Z-direction position detection system are all 0. The alignment is thereby completed.

The k-clock generation interference optical system 400 illustrated in FIG. 1 is a device that optically generates a sample clock (k-clock) from input light branched from the SMFC 101 in order to sample a measurement interference signal at an equal interval frequency. The k-clock signal generated by the k-clock generation interference optical system 400 is input to the control unit 500. By the control unit 500 referring to the k-clock signal, distortion of the measurement interference signal is suppressed, and resolution is prevented from deteriorating.

Figure 3:
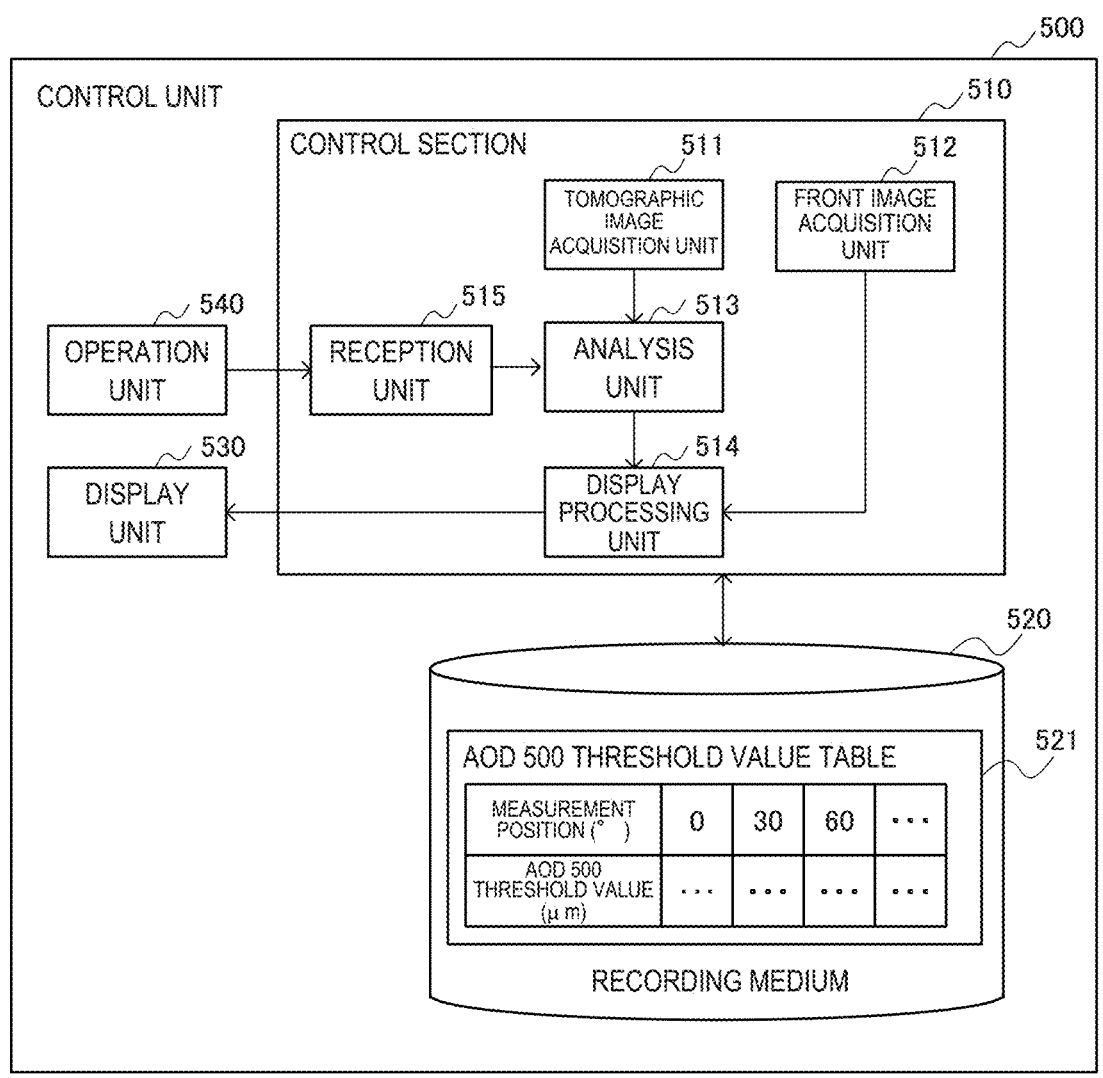
FIG. 3 is a configuration diagram of a control unit.

FIG. 3 is a configuration diagram of the control unit 500. The control unit 500 includes a control section 510, a recording medium 520, a display unit 530, and an operation unit 540. The control section 510 includes a CPU, a ROM, and a RAM (not illustrated). The control section 510 performs various processes by executing a program stored in the recording medium 520. The control section 510 controls each control target included in the OCT interference system 100, the scanning-alignment optical system 200, the reference optical system 300, and the k-clock generation interference optical system 400, for example, a motor for alignment, an area sensor 208, and the like. Furthermore, the control section 510 generates (acquires) a tomographic image based on information output from the OCT interference system 100, the scanning-alignment optical system 200, and the like.

The recording medium 520 stores various programs and various data. The display unit 530 displays various types of information. The display unit 530 displays, for example, a tomographic image or a front image of the anterior eye segment. The operation unit 540 receives an input from a user. The operation unit 540 is, for example, a keyboard, a mouse, or the like. As another example, the operation unit 540 may be a touch panel provided integrally with the display unit 530.

The control section 510 functions as a tomographic image acquisition unit 511, a front image acquisition unit 512, an analysis unit 513, a display processing unit 514, and an reception unit 515 by executing a program stored in the recording medium 520. That is, in the following description, processes described as being performed by the tomographic image acquisition unit 511, the front image acquisition unit 512, the analysis unit 513, the display processing unit 514, and the reception unit 515 are processes executed by the control section 510 (CPU).

The tomographic image acquisition unit 511 controls the OCT interference system 100, the scanning-alignment optical system 200 (such as the galvano-scanner 202), and the k-clock generation interference optical system 400 to acquire a measurement interference signal. Then, the tomographic image acquisition unit 511 performs processes such as inverse Fourier transformation on the measurement interference signal to acquire a tomographic image of the anterior eye segment Ec along the scanning line.

Figure 4:
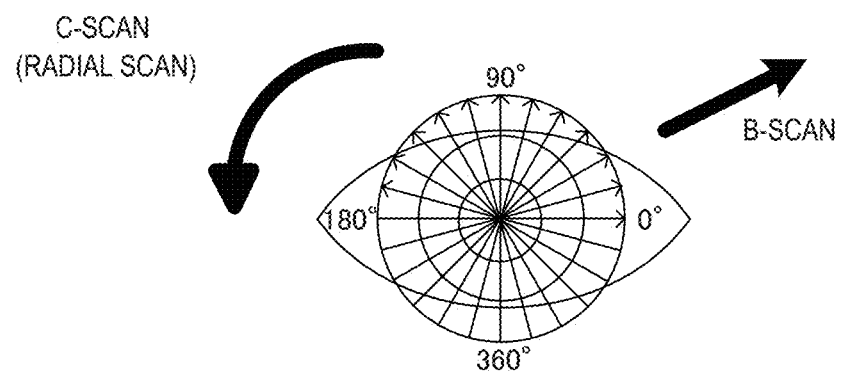
FIG. 4 is an explanatory diagram of radial scan.

The tomographic image acquisition unit 511 changes the scanning direction in the galvano-scanner 202 and acquires tomographic images for a plurality of slice surfaces. In the present embodiment, the tomographic image acquisition unit 511 performs radial scan illustrated in FIG. 4. In the radial scan, the radiation direction having the corneal vertex of the eye to be examined E as the center is the B-scan direction, the circumferential direction of the anterior eye segment surface of the eye to be examined E is the C-scan direction, and the two-dimensional tomographic image of each slice surface is captured. Note that the center of the radial scan may not strictly match the corneal vertex. As another example, the center of the radial scan may be a position that substantially matches the corneal vertex, such as the pupil center or the corneal diameter center. The tomographic image thus obtained includes two anterior chamber angles of the anterior eye segment Ec. A plurality of tomographic images constituting the anterior eye segment three-dimensional image of the eye to be examined E is obtained by the radial scan. In the present embodiment, 18 tomographic images are acquired at 10° intervals. Note that the interval at which tomographic images are acquired is not limited to implementation. In this manner, the tomographic image acquisition unit 511 acquires a plurality of tomographic images including an anterior chamber angle in different radiation directions with the corneal vertex as the center.

Note that, in the present embodiment, the measurement position, which is the position of the tomographic image in the radial scan in which the anterior chamber angle is obtained, is represented by a rotation angle from a predetermined position of a circle having the corneal vertex as the center. In the present embodiment, the position on the right side of the anterior eye segment in the front image is referred to as a rotation angle of 0°, the upper side is referred to as a rotation angle of 90°, the left side is referred to as a rotation angle of 180°, and the lower side is referred to as a rotation angle of 270°.

After the alignment is completed, the front image acquisition unit 512 controls the anterior eye segment capturing system (area sensor 208 etc.) to acquire the front image of the anterior eye segment existing in the field of view of the anterior eye segment capturing system. Here, the inside of the field of view of the anterior eye segment capturing system is a range corresponding to the area sensor 208. In the present embodiment, the position of each pixel of the tomographic image and the position of each pixel of the front image are both corresponded with the position of the XYZ space based on the position of the device main body. Therefore, the correspondence relationship between the positions of each tomographic image and the front image can be specified by the positions of the pixels of both images.

Figure 5:
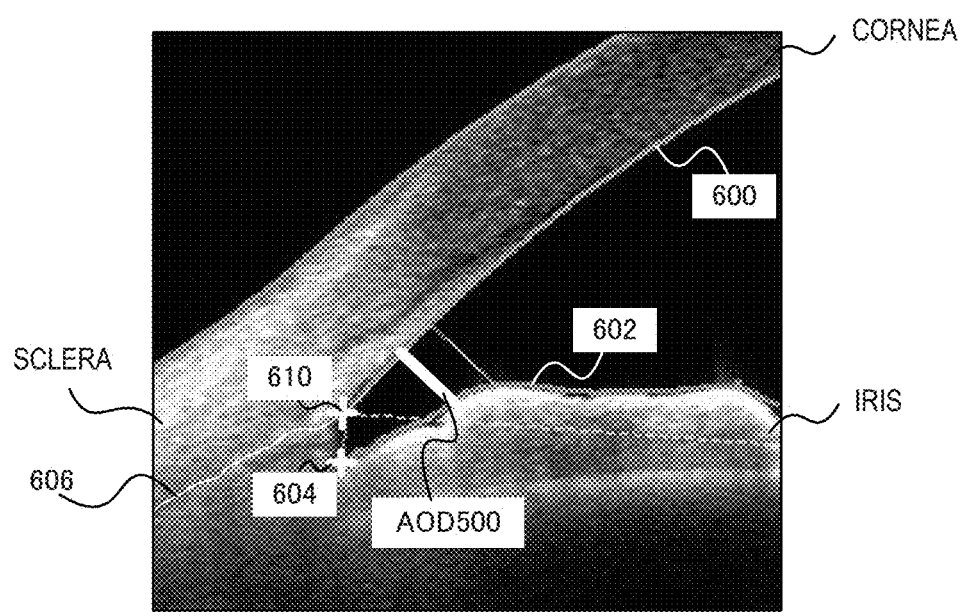
FIG. 5 is an explanatory diagram of an AOD 500.

The analysis unit 513 obtains an analysis value related to an anterior chamber angle from each of the plurality of tomographic images. Here, the analysis value is an evaluation value used in analysis for finding eye abnormality. More specifically, the analysis value is an evaluation value used to evaluate the extent of narrow angle. In the present embodiment, a value of an angle opening distance (AOD) 500 is obtained as the analysis value related to the anterior chamber angle. The AOD 500 is the distance of a line segment to the iris perpendicularly lowered from a point of 500 µm from the scleral spur at the boundary of the back side of the cornea (iris side). That is, the AOD 500 is an example of the distance between the cornea and the iris at a predetermined position based on the position of the scleral spur. The predetermined position is not limited to the position of 500 µm from the position of the scleral spur, and may be a distance of 250 µm as another example. In FIG. 5, the AOD 500 is indicated by a white line. Note that FIG. 5 is a view illustrating a tomographic image showing the vicinity of the anterior chamber angle.

It can be seen that the smaller the value of the AOD 500, the narrower the anterior chamber angle. The analysis unit 513 comprehensively determines the extent of narrow angle based on the value of the AOD 500 at each of the plurality of positions. Note that details of the processing of the analysis unit 513 will be described later with reference to FIG. 6 and the like.

Diseases in which the anterior chamber angle becomes narrower include PACS (primary angle closure suspect), PAC (primary angle closure), PACG (primary angle closure glaucoma), acute glaucoma attacks, acute primary angle closure glaucoma, and secondary glaucoma (1. direct angle closure due to peripheral anterior synechiae (PAS) occurring independently of anterior chamber depth 2. forward movement of the iris-crystalline lens due to causes other than pupil block). For example, primary angle closure is a state in which the anterior chamber angle is narrow. The primary angle closure glaucoma is a state in which the anterior chamber angle is narrow, the outflow resistance of aqueous humor is high, the intraocular pressure is increased, and the damage of the optic nerve is occurring. An acute glaucoma attack is a state in which the anterior chamber angle and the iris are closed, the aqueous humor cannot flow out, and the intraocular pressure is rapidly increased.

The display processing unit 514 displays various types of information on the display unit 530. The reception unit 515 receives an instruction or the like corresponding to a user operation on the operation unit 540.

The recording medium 520 stores an AOD 500 threshold value table 521. In the AOD 500 threshold value table 521, the AOD 500 threshold value for each measurement position at which the anterior chamber angle is obtained is shown. The AOD 500 threshold value is an index value for determining a narrow angle, and is an example of a distance threshold value. When the AOD 500 calculated in the tomographic image of the eye to be examined E is less than the AOD 500 threshold value, it is determined as the narrow angle. It is known that the size of the anterior chamber angle differs depending on the position (rotation angle) of the anterior chamber angle. For example, the anterior chamber angle of the upper side (e.g., rotation angle 90°) of the anterior eye segment is narrower than the left and right (e.g., rotation angle 0° or 180°) anterior chamber angles of the anterior eye segment. In correspondence therewith, in the AOD 500 threshold value table 521 of the present embodiment, the AOD 500 threshold value for each measurement position (rotation angle) of the anterior chamber angle is defined in advance. Each AOD 500 threshold value in the AOD 500 threshold value table 521 is preferably a value determined by a statistical analysis of the values of the AOD 500 actually measured in the anterior eye segment of a number of normal eyes that is known to be an open angle. For example, a 10 percentile value or a 5 percentile value of the AOD 500 measured in the normal eye may be determined as the AOD 500 threshold value.

Figure 6:
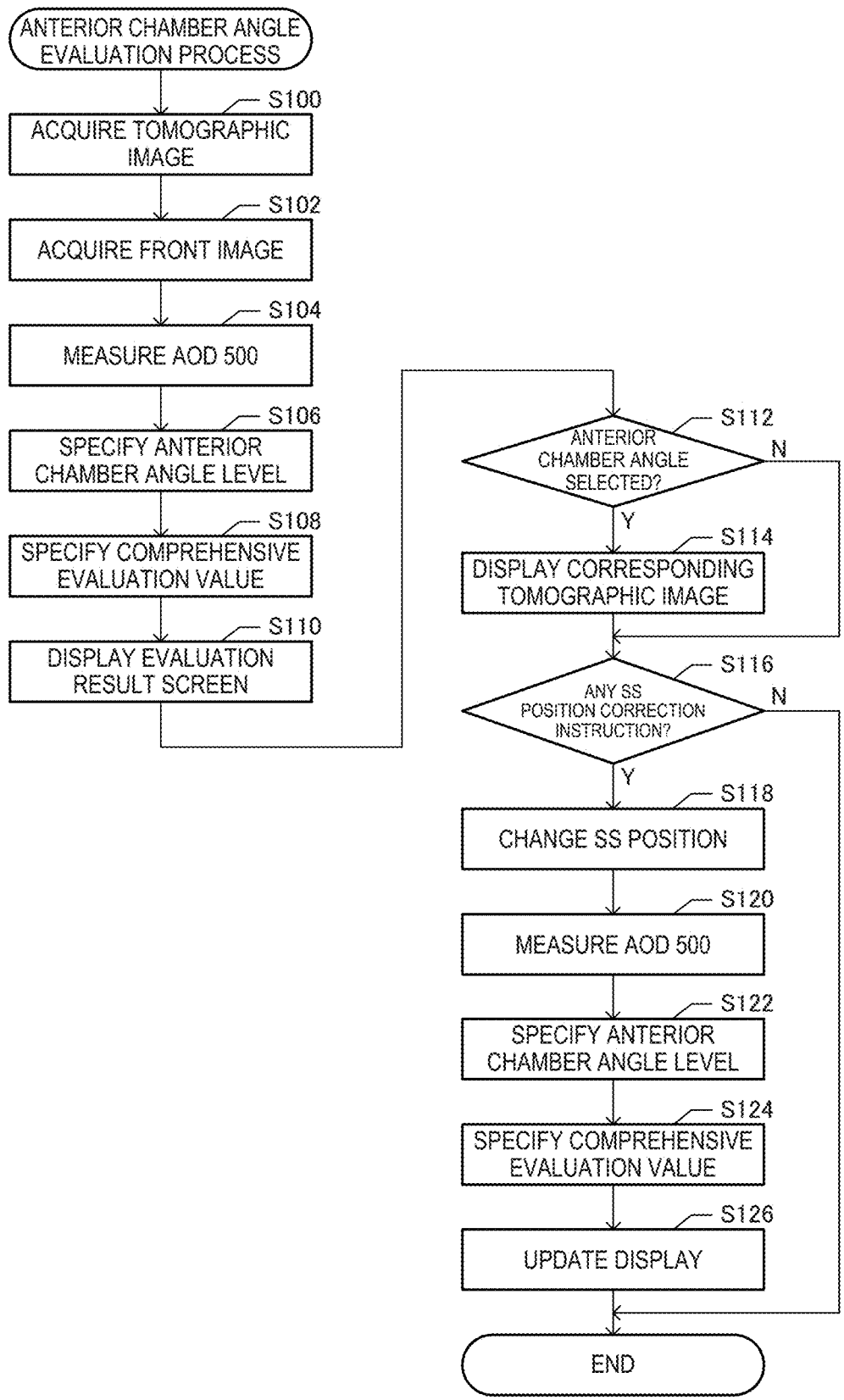
FIG. 6 is a flowchart illustrating anterior chamber angle evaluation processing.

FIG. 6 is a flowchart illustrating the anterior chamber angle evaluation process by the control section 510. The anterior chamber angle evaluation process is the process of evaluating the narrowness of the anterior chamber angle by image processing on the tomographic image. Note that, in the anterior chamber angle evaluation process, the tomographic image and the front image are acquired, but it is assumed that the alignment in the scanning-alignment optical system is completed before the acquisition.

In the anterior chamber angle evaluation process, first, the tomographic image acquisition unit 511 of the control section 510 acquires a plurality of tomographic images constituting a three-dimensional image (S100). Specifically, the tomographic image acquisition unit 511 acquires a plurality of tomographic images constituting the three-dimensional image of the anterior eye segment while changing the scanning direction in the galvano-scanner 202. In the present embodiment, 18 tomographic images are obtained by radial scan at 10° intervals. Next, the front image acquisition unit 512 controls the anterior eye segment capturing system to acquire the front image (S102).

Next, the analysis unit 513 measures the value of the AOD 500 for each of the two anterior chamber angles included in each tomographic image obtained in S100 (S104). In measuring the AOD 500, the analysis unit 513 first specifies the position of the scleral spur. Hereinafter, the position of the scleral spur is referred to as the SS position. Note that the SS position is used when calculating the value of the AOD 500. Specifically, the analysis unit 513 first extracts an image in the vicinity of an anterior chamber angle from the tomographic image. Thus, for example, an image as illustrated in FIG. 5 is extracted. Hereinafter, the extracted image is referred to as a local image. The analysis unit 513 detects the corneal posterior surface edge line 600 and the iris anterior surface edge line 602 on the basis of the luminance gradient in the local image. The corneal posterior surface edge line 600 is an edge line corresponding to the surface of the cornea on the iris side. The iris anterior surface edge line 602 is an edge line corresponding to the surface of the iris on the cornea side. These edge detections are performed by comparison with a threshold value of a luminance gradient.

The analysis unit 513 specifies the sclera-uvea edge line 606 based on the magnitude of the luminance gradient with reference to a curved point (correspond to the anterior chamber angle base 604) of the edge line formed by connecting the corneal posterior surface edge line 600 and the iris anterior surface edge line 602. Here, the sclera-uvea edge line 606 is an edge line corresponding to the boundary between the sclera and the uvea.

Then, the analysis unit 513 specifies an intersection of the sclera-uvea edge line 606, the corneal posterior surface edge line 600, and the iris anterior surface edge line 602 as the SS position 610. For example, the analysis unit 513 may use a technique described in Japanese Laid-Open Patent Application No. 2015-66084 as the process for specifying the SS position 610.

Note that the analysis unit 513 merely needs to specify the SS position based on the tomographic image, and the specific process therefor is not limited to the present embodiment. As another example, the analysis unit 513 may specify the SS position using the SS position estimation model. In this case, the SS position estimation model is learned (generated) by using the correct image in which the SS position is specified for the test, and the SS position estimation model is stored in the recording medium 520. Furthermore, as another example, a tomographic image may be displayed on the display unit 530, and the SS position may be designated by the user. In this case, the analysis unit 513 may measure the AOD 500 based on the SS position designated by the user.

Next, the analysis unit 513 classifies the anterior chamber angle obtained at each measurement position into a plurality of anterior chamber angle levels (S106). Here, the anterior chamber angle level is a level set according to the size of the anterior chamber angle. In the present embodiment, the anterior chamber angle level includes three levels of an open angle, a narrow angle, and a closed angle in order of wide anterior chamber angle. The analysis unit 513 classifies the anterior chamber angle of each measurement position into a plurality of anterior chamber angle levels by comparing each AOD 500 of the anterior chamber angle of each measurement position with an AOD 500 threshold value of the relevant position. A value stored in the AOD 500 threshold value table 521 is used as the AOD 500 threshold value of each measurement position. For example, the AOD 500 of the anterior chamber angle of rotation angle 30° is compared with the AOD 500 threshold value associated with the rotation angle 30°. In the present embodiment, when the value of the AOD 500 is greater than or equal to the AOD 500 threshold value, the analysis unit 513 determines that the anterior chamber angle level is the open angle. When the value of the AOD 500 is smaller than the threshold value of the AOD 500 and is not zero, the analysis unit 513 determines that the anterior chamber angle level is the narrow angle. When the value of the AOD 500 is zero, the analysis unit 513 determines that the anterior chamber angle level is the closed angle. The anterior chamber angle level is an example of information related to the AOD 500 as an analysis value.

Then, the analysis unit 513 specifies the comprehensive evaluation value based on the anterior chamber angle level of each measurement position (S108). The comprehensive evaluation value is an evaluation value for comprehensively evaluating the extent of narrow angle in the anterior eye segment Ec. In the present embodiment, the comprehensive evaluation value includes a narrow angle-closed angle ratio, a narrow angle ratio, and a closed angle ratio.

The narrow angle ratio is a ratio at which the narrow angle is obtained among the anterior chamber angles corresponding to all the measurement positions. As described above, it is assumed that 18 of the 24 locations are narrow angles. In this case, the analysis unit 513 determines that the narrow angle is 60% (18/24). The closed angle ratio is a ratio at which the closed angle is obtained among all the anterior chamber angles. It is assumed that three locations are closed angles. In this case, the analysis unit 513 determines that the closed angle is 12.5% (3/24). The narrow angle-closed angle ratio is a ratio at which the narrow angle and the closed angle are obtained among all the anterior chamber angles. It is assumed that 18 anterior chamber angles are narrow angles and 3 anterior chamber angles are closed angles. In this case, the analysis unit 513 determines that the narrow angle-closed angle ratio is 87.5% (21/24).

As described above, the comprehensive evaluation value is a value comprehensively evaluated based not only on the extent of narrowness of one anterior chamber angle but also the analysis result obtained over the entire anterior chamber angle. Therefore, the doctor can determine the state of the anterior chamber angle more accurately by referring to the comprehensive evaluation value as compared with the case where the state of the anterior chamber angle is determined by the narrowness of the anterior chamber angle at a certain position.

Figure 7:
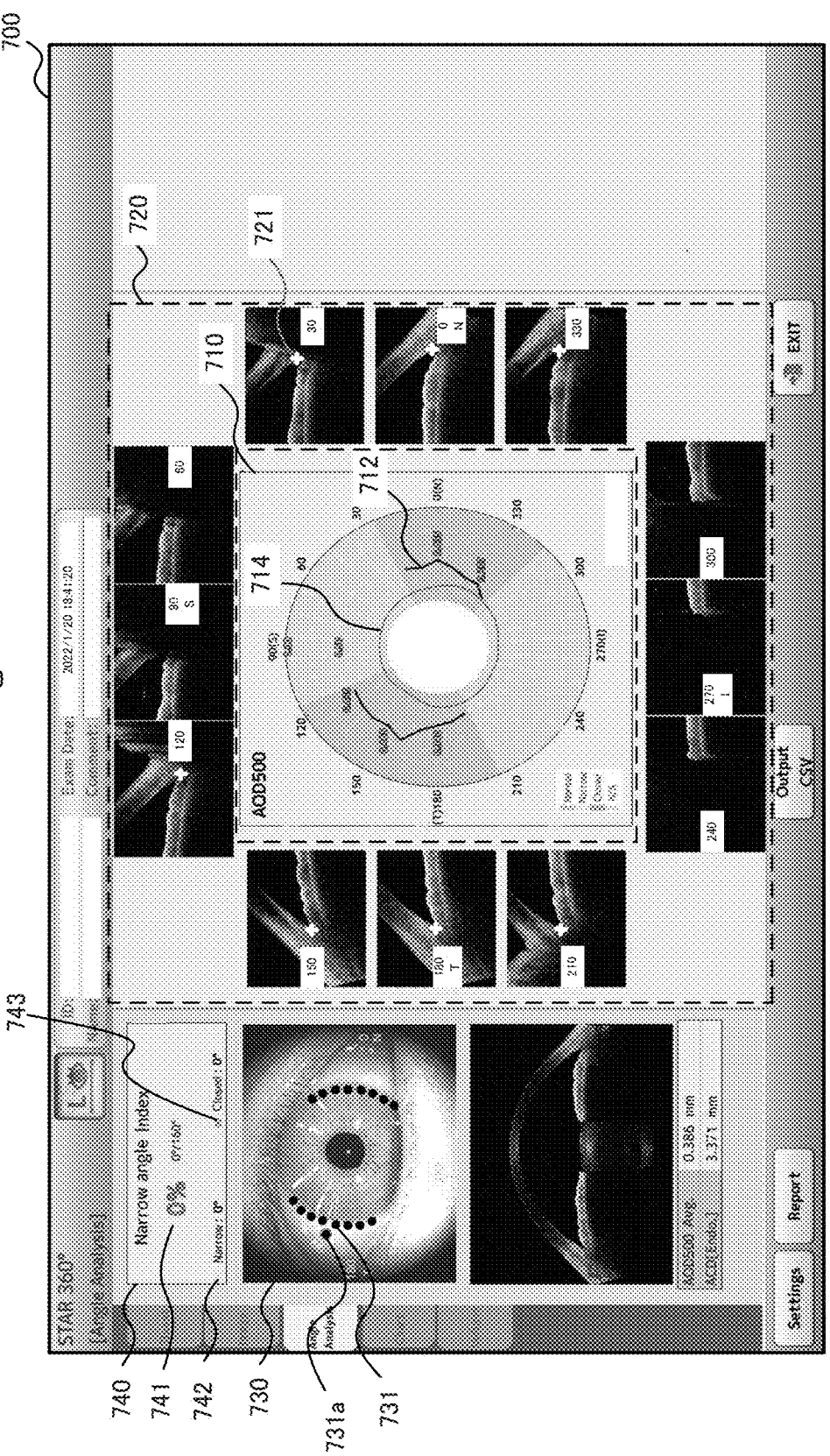
FIG. 7 is a view illustrating a display example of an evaluation result screen.

Next, the display processing unit 514 displays the evaluation result screen on the display unit 530 (S110). FIG. 7 is a view illustrating a display example of an evaluation result screen 700. The evaluation result screen 700 is provided with a chart region 710, a tomographic image region 720, a front image region 730, and a comprehensive evaluation region 740.

A circular chart is displayed in the chart region 710. The chart corresponds to the anterior eye segment and its center corresponds to the corneal vertex. Each circumferential position of the chart indicates a position (rotation angle) on the anterior eye segment surface, and the radiation (line extending in the radial direction) extending from the center of the circle of the chart is an axis indicating the value of the AOD 500. The AOD 500 shows a larger value as it moves away from the center. On the chart, a measurement result 712 indicating the value of the AOD 500 at each measurement position obtained in S104 is displayed. Furthermore, an AOD 500 threshold value 714 of each measurement position is displayed. Note that in the example of FIG. 7, since the value of AOD 500 is not obtained in the range of the rotation angles of 20° to 110° and 200° to 310°, the measurement result 702 is not displayed in this range.

The background of the chart is colored with a color indicating the anterior chamber angle level of each measurement position. For example, the ranges corresponding to the open angle, the narrow angle, and the closed angle are colored in green, yellow, and red, respectively. Thus, the display processing unit 514 displays the range corresponding to the measurement position where the anterior chamber angle level is obtained with a color indicating the anterior chamber angle level. Here, the range corresponding to the measurement position where the anterior chamber angle level is obtained is a range of 5° in each of the positive direction and the negative direction around the measurement position (rotation angle). The range corresponding to the measurement position where the anterior chamber angle level is obtained may be a predetermined angle range including the measurement position where the anterior chamber angle level is obtained, and is not limited to the embodiment. In this manner, since the background of the chart is colored in a color corresponding to the anterior chamber angle level, the user can visually and easily grasp the anterior chamber angle level for each measurement position. Furthermore, since the value of the AOD 500 and the background color are displayed on the chart, the user can check the value of the AOD 500 and the anterior chamber angle level in association with each other. Note that the background color of the chart indicates an anterior chamber angle level for each measurement position of the anterior chamber angle. That is, the process in which the display processing unit 514 displays the range corresponding to each measurement position in the background of the chart with coloring the range with the color of the anterior chamber angle level at each position is an example of the process of displaying the anterior chamber angle level in association with the measurement position.

In the tomographic image region 720, a thumbnail of the anterior chamber angle corresponding to each measurement position is displayed along the measurement positions of the anterior chamber angles on the chart. Each thumbnail corresponds to each tomographic image obtained in S100. An SS position 721 is shown on each thumbnail. Thus, the user can check, together with the measurement result of the AOD 500 and the anterior chamber angle level of the tomographic image expressed by coloring, the tomographic image in which these results are obtained. Note that, in the example illustrated in FIG. 7, the thumbnails of the anterior chamber angles at 12 positions are displayed at equal intervals among the anterior chamber angles at all positions (the anterior chamber angles at 36 positions) obtained in S100. Thus, it is not necessary to display the thumbnails corresponding to all the tomographic images. In addition, the number of thumbnails displayed in the tomographic image region 720 is not limited to the embodiment.

The front image of the anterior eye segment acquired in S102 is displayed in the front image region 730. Furthermore, a point 731 indicating the SS position is superimposition displayed on the front image. The display processing unit 514 sets a position in the front image corresponding to the measurement position (rotation angle) at which the anterior chamber angle is obtained with the corneal vertex as the center. Then, the display processing unit 514 superimposes and displays the mark 731 on the radiation extending in the direction of the rotation angle corresponding to the position of the anterior chamber angle and at the position corresponding to the SS position obtained at the position of the anterior chamber angle in the front image. As the SS position, a value obtained by the analysis unit 513 is used when calculating the AOD 500 in S104. In this manner, the mark indicating the SS position corresponding to each of the plurality of anterior chamber angles is superimposition displayed on the front image. Note that the shape of the mark 731 is not limited to a point as long as it is a color indicating the anterior chamber angle level and indicating the SS position. The mark 731 may have a shape such as x other than the point.

Furthermore, each mark 731 superimposed on the front image is colored in a color corresponding to an anterior chamber angle level specified at each measurement position (rotation angle). That is, the process in which the display processing unit 514 superimposition displays the mark 731 colored with the color indicating the anterior chamber angle level obtained at each measurement position at the position corresponding to the anterior chamber angle position in the front image is an example of the process of displaying the anterior chamber angle level in association with the measurement position. As described above, since each mark 731 is displayed at the SS position in the color indicating the anterior chamber angle level, the user can visually and easily grasp the relationship between the SS position and the anterior chamber angle level obtained at the SS position.

Furthermore, for example, in a case where an SS position deviated from an approximate circle (ellipse) corresponding to the entire periphery of the SS position assumed from a plurality of SS positions is specified, it is arranged at a position deviated from the approximate circle as in the mark 731a. Therefore, the user can easily grasp that there is a high possibility that the SS position corresponding to the mark 731a is an incorrect value. In this manner, the user can appropriately determine whether the SS position is appropriately specified at each anterior chamber angle by referring to the SS position of each of the plurality of anterior chamber angles. Furthermore, the user can also determine whether the SS position is correct based on the SS position and the position of the cornea shown in the front image.

The comprehensive evaluation value obtained in S108 is displayed in the comprehensive evaluation region 740. In the present embodiment, the narrow angle-closed angle ratio 741 is displayed as the comprehensive evaluation value. At this time, the narrow angle-closed angle ratio 741 is displayed such that a case where the value is greater than or equal to 25% and a case where the value is less than 25% can be identified. For example, it is displayed in red if the value is greater than or equal to 25%, and in green if less than 25%. For example, as in the example of FIG. 7, in a case where the anterior chamber angles of all the rotation angles are determined as open angles, with green indicating the open angle, the narrow angle-closed angle ratio 0% is displayed in green. The comprehensive evaluation region 740 further displays a narrow angle ratio 742 and a closed angle ratio 743. If the narrow angle-closed angle ratio 741 is high, the possibility of angle closure is high. Therefore, in the present embodiment, 25% is set as a threshold value, and in a case where the value is greater than or equal to the threshold value, it is indicated in red to call the user's attention. Note that the threshold value may be a value set in advance, and is not limited to 25%.

As described above, in the comprehensive evaluation region 740, the comprehensive evaluation value of the narrowness of the anterior chamber angle specified based not only on the anterior chamber angle level of a certain measurement position but also on the anterior chamber angle level at each of the plurality of measurement positions is displayed. Accordingly, it is possible to provide information for comprehensive diagnosis by a doctor in consideration of an anterior chamber angle level at a plurality of circumferential positions.

Note that in the present embodiment, the display processing unit 514 displays the narrow angle-closed angle ratio as the comprehensive evaluation value. However, the comprehensive evaluation value is not limited to the narrow angle-closed angle ratio. As another example, the display processing unit 514 may display the closed angle ratio and the open angle ratio as the comprehensive evaluation value. The display processing unit 514 may display at least one of the narrow angle-closed angle ratio, the closed angle ratio, and the open angle ratio as the comprehensive evaluation value.

Figure 8:
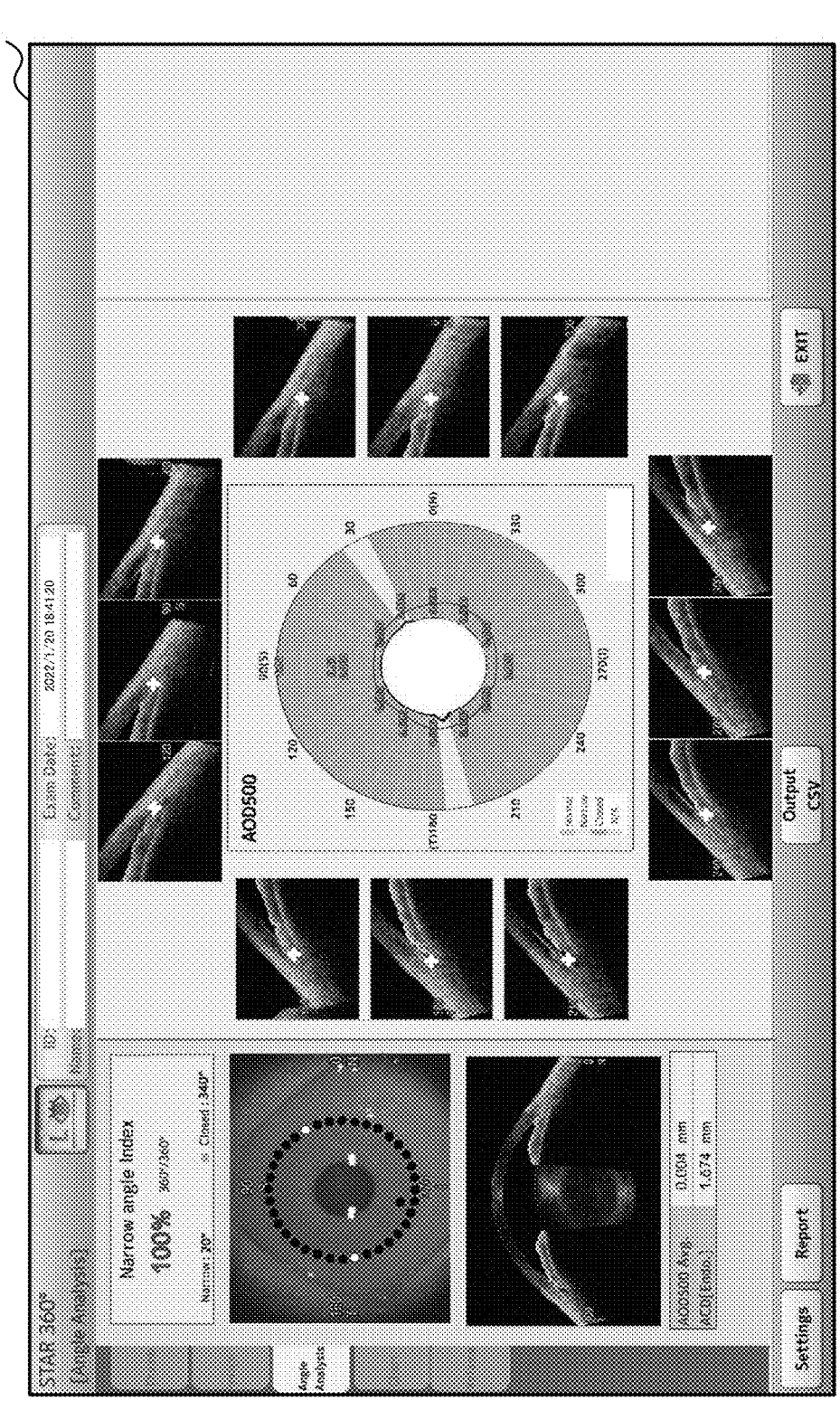
FIG. 8 is a view illustrating a display example of an evaluation result screen.

FIG. 8 is a view illustrating an example of an evaluation result screen 800 illustrating a result of the narrow angle-closed angle ratio of 100%. In the result shown in the evaluation result screen 800, the AOD 500 at any rotation angle is a value smaller than the AOD 500 threshold value.

The description returns to FIG. 6. After the evaluation result screen is displayed in S110, the reception unit 515 determines whether or not the anterior chamber angle of one measurement position is selected by the operation of the operation unit 540 by the user (S112). When the anterior chamber angle is not selected (N in S112), the reception unit 515 proceeds the process to S116. When the anterior chamber angle is selected (Y in S112), the reception unit 515 proceeds the process to S114. Note that the selection of the anterior chamber angle is performed by a user operation using the operation unit 540.

Examples of the user operation in this case include selection of a mark on the front image. In a case where there is a mark arranged at a position shifted from the approximate circle assumed from the plurality of marks, the user can select the relevant mark as the correction target of the SS position. Note that the user operation for selecting the anterior chamber angle is not limited to the embodiment. Other examples of the user operation include selection of a thumbnail and selection of a position corresponding to the rotation angle on the chart. However, the user operation is not limited to the embodiment.

Figure 9:
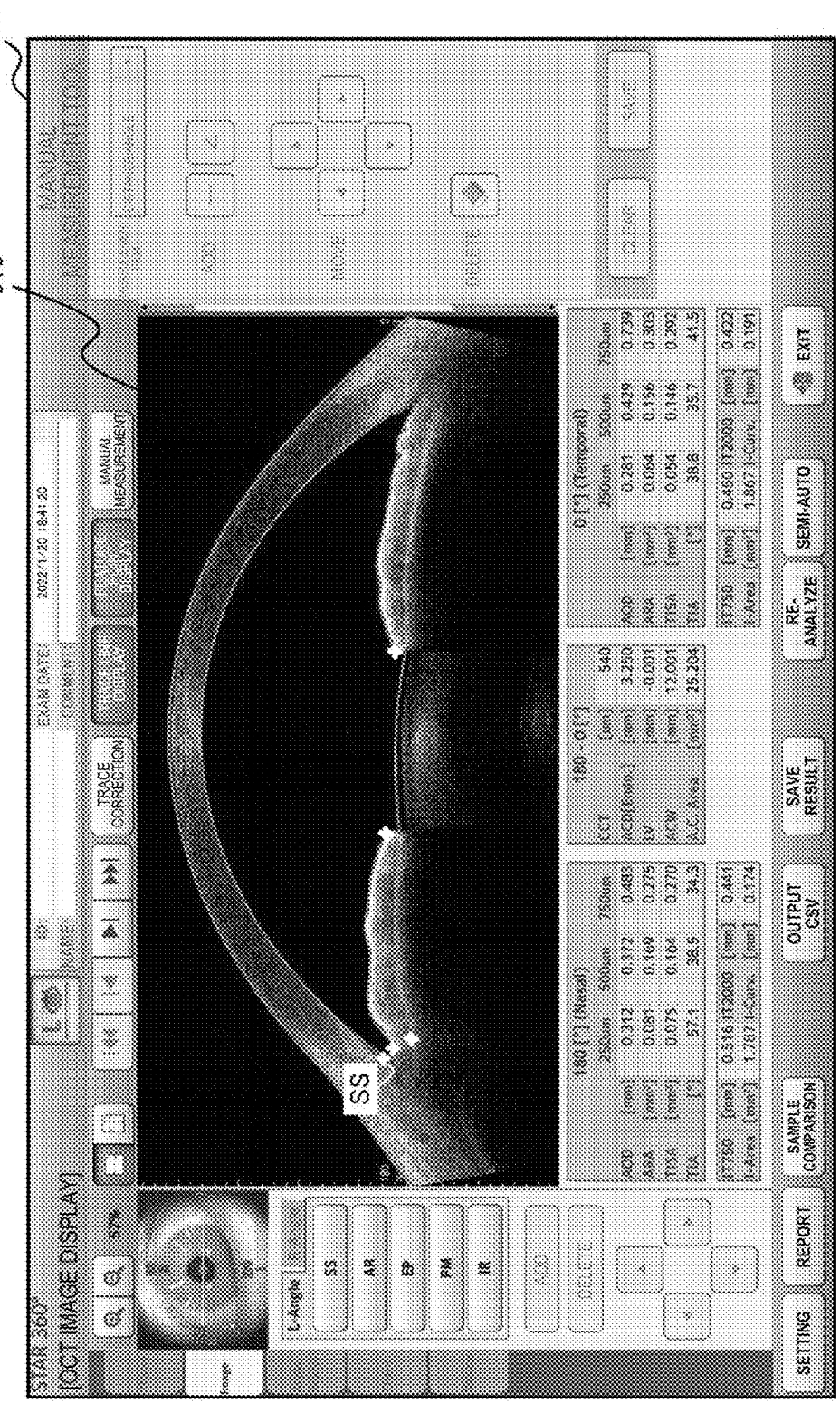
FIG. 9 is a view illustrating a display example of a tomographic image screen.

In S114, the display processing unit 514 displays the tomographic image of the selected anterior chamber angle. Specifically, the display processing unit 514 displays a tomographic image screen including a tomographic image. FIG. 9 is a view illustrating a display example of a tomographic image screen 900. A tomographic image 910 is displayed on the tomographic image screen 900. In the tomographic image 910, an x mark indicating the SS position is displayed. The user can confirm the SS position and correct the SS position as necessary. In a case where it is desired to correct the SS position, the user performs an operation of moving the x mark on the tomographic image 910, inputting the coordinates of the SS position, or the like by the operation unit 540. As a result, a correction instruction of the SS position can be input. Note that the correction instruction includes the SS position after the correction. Note that the tomographic image displayed in S114 merely needs to include at least the anterior chamber angle selected by the user, and may not be the entire outer image of the tomographic image.

The description returns to FIG. 6. After displaying the tomographic image screen in S114, the reception unit 515 determines whether or not a correction instruction of the SS position has been received by a user operation (S116). When not receiving the correction instruction of the SS position (N in S116), the reception unit 515 terminates the tomographic image processing. When receiving the correction instruction of the SS position (Y in S116), the reception unit 515 proceeds the process to S118. In S118, the analysis unit 513 corrects the SS position according to the SS position after the correction indicated in the correction instruction. Next, the analysis unit 513 measures the AOD 500 based on the SS position after the correction (S120). Next, the analysis unit 513 specifies an anterior chamber angle level based on the value of the AOD 500 calculated in S118 (S122). Next, the analysis unit 513 specifies the comprehensive evaluation value using the value of the AOD 500 obtained from the SS position according to the change instruction and the anterior chamber angle level (S124).

Thereafter, the display processing unit 514 updates the display based on the values obtained in S118 to S124 (S126). Specifically, the display processing unit 514 updates the SS position in the tomographic image screen. In addition, in a case where the value of the AOD 500 is displayed on the tomographic image screen, the value is updated. Furthermore, in a case where the display is switched to the evaluation result screen according to the user operation, the display processing unit 514 updates the value of the AOD 500 and the background color indicated in the chart region 710 in the evaluation result screen. In addition, the display processing unit 514 updates the display of the mark corresponding to the SS position on the thumbnail of the tomographic image related to the change and the SS position related to the change instruction on the front image. Moreover, the display processing unit 514 updates the narrow angle-closed angle ratio 741, the narrow angle ratio 742, and the closed angle ratio 743 indicated in the comprehensive evaluation region 740. Note that, in a case where there is no change in the value due to the change in the SS position, there is no need to update. Thus, the tomographic image processing is terminated. Note that the process after the evaluation result screen display processing (S110) shown in the anterior chamber angle evaluation processing illustrated in FIG. 6 corresponds to an example of the user operation. The control section 510 appropriately switches the tomographic image screen and the evaluation result screen in response to a screen switching instruction by a user operation, and appropriately switches the display of the value of each AOD 500 and the like in response to a correction instruction of the SS position.

As described above, the ophthalmology device 1 of the present embodiment displays the value of the AOD 500 of the anterior chamber angle of the eye to be examined and the anterior chamber angle level in association with the measurement position (rotation angle) at which these values are obtained. Therefore, more effective information indicating the state of the anterior chamber angle of the eye to be examined can be provided. Furthermore, the ophthalmology device displays the anterior chamber angle level and the SS position by superimposing them on the front image of the anterior eye segment. Therefore, the user can visually grasp the relationship between the anterior chamber angle level and the SS position and the actual position of the anterior eye segment.

The above embodiment is an example for carrying out the present disclosure, and various other embodiments can be adopted. At least some configurations of the embodiment described above may be omitted or replaced. Furthermore, as another example, at least a part of the processing may be omitted, replaced, rearranged, or the like.

As such a modified example, two tables for a bright room and a dark room may be stored in the recording medium 520 as the AOD 500 threshold value table. AOD threshold values are different between the bright room and the dark room. This corresponds to the fact that the narrowness of the anterior chamber angle differs by the surrounding brightness. In this case, the analysis unit 513 selects a table to be used for processing according to the surrounding brightness. Furthermore, in this case, it is assumed that brightness or a table to be used is selected according to a user operation. Furthermore, as another example, the analysis unit 513 may automatically determine the presence or absence of illumination projected in the eyes in the front image by image analysis, and select the AOD threshold value table to be used according to the determination result. Furthermore, as another example, the pupil diameter at the time of measurement may be measured, and when the pupil diameter is smaller than a preset reference value, the AOD 500 threshold value table for the bright room may be selected, and when the pupil diameter is greater than or equal to the reference value, the AOD 500 threshold value table for the dark room may be selected.

The ophthalmology device 1 merely needs to perform optical coherence tomography, and a method therefor is not limited to the embodiment. Examples of other methods include, for example, time domain optical coherence tomography (TD-OCT) and other methods of Fourier domain such as spectral domain optical coherence tomography (SD-OCT).

The tomographic image acquisition unit 511 merely needs to acquire a plurality of tomographic images having different radiation directions in radial scan having the conical vertex as the center, and does not need to acquire tomographic images over 360°. Furthermore, in the present embodiment, 18 tomographic images are obtained over 360°, but the number of tomographic images is not limited to 18. As another example, 16 tomographic images (32 anterior chamber angle images) may be acquired. In addition, in each tomographic image, the interval of radial scans may not be equal interval.

Figure 10:
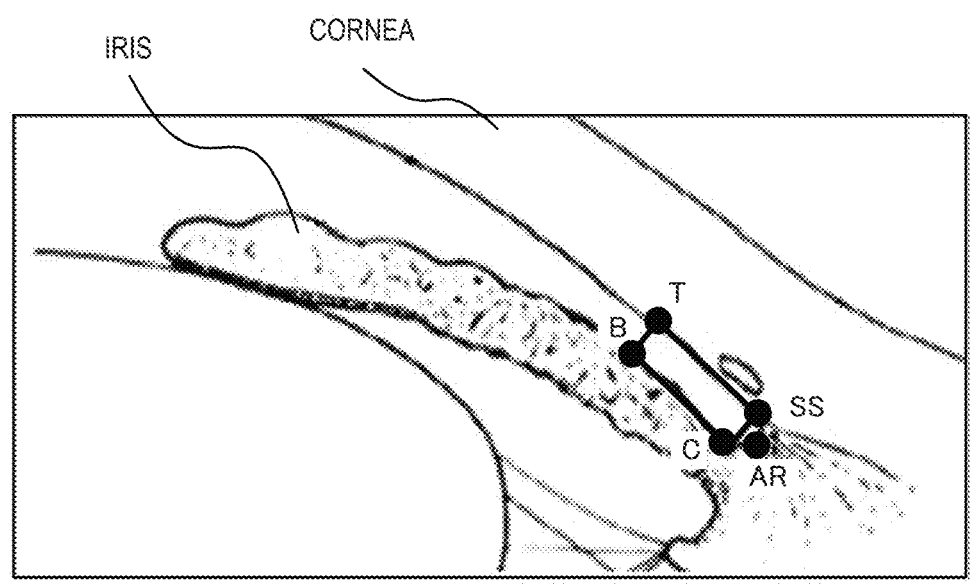
FIG. 10 is an explanatory diagram of an analysis value according to another example.

The analysis unit 513 of the present embodiment merely needs to obtain the analysis value related to the anterior chamber angle, and the analysis value is not limited to the AOD 500. Other examples of the analysis value include angle recess area (ARA), trabecular iris space area (TISA), trabecular iris angle (TIA) and the like. FIG. 10 is an explanatory diagram of these analysis values. ARA is an area of a range surrounded by AR, SS, T, B, and C illustrated in FIG. 10. Here, AR is the anterior chamber angle base and SS is the position of the scleral spur. T is a position on the corneal posterior surface at a predetermined distance from the scleral spur. B is a position where a perpendicular line from the T in the corneal posterior surface intersects the iris anterior surface. C is the position where the perpendicular line from the SS in the corneal posterior surface intersects the iris anterior surface.

TISA is an area of a range surrounded by SS, T, B, and C. TIA is the angle of the corner B-AR-T. Note that, for these analysis values, similarly to the AOD 500, a threshold value indicating a normal range is set in advance in each of the vertical and horizontal directions, and the extent of the narrow angle is evaluated by comparison with the threshold value.

In addition, the display processing unit 514 may display the analysis value on the display unit in association with the measurement position at which the anterior chamber angle is obtained, and the display mode thereof is not limited to the embodiment. As another example, the display processing unit 514 may display a list in which the analysis value and the rotation angle are associated with each other. In addition, in the present embodiment, the measurement position is expressed by the rotation angle, but the measurement position may indicate any position of the positions in the circumferential direction of the anterior chamber angle surrounding the periphery of the cornea. As another example, the measurement position may be expressed as up down, or the like.

Although the display processing unit 514 of the present embodiment displays the analysis level together with the AOD 500 serving as the analysis value, the information regarding the analysis value to be displayed merely need to be information obtained from the analysis value, and is not limited to the analysis level according to the present embodiment. As another example, the information regarding the analysis value may be two-stage analysis levels with the AOD 500 threshold value as a boundary.

Furthermore, in the front image area 730 of the evaluation result screen 700, the mark may not be displayed at a position corresponding to the SS position. For example, the display processing unit 514 may display a mark at a position corresponding to the rotation angle at which the anterior chamber angle is obtained on a circle having a predetermined radius with the corneal vertex of the front image as the center. In this case, although the user does not know the SS position, the user can grasp the anterior chamber angle level for each rotation angle by the color of the mark.

What is claimed is:

1. A tomographic image processing device comprising:
a recording medium that stores a program; and
a processor, wherein the processor is configured to function as a tomographic image acquisition unit, an analysis unit, a display processing unit, and a front image acquisition unit by executing the program stored in the recording medium, the tomographic image acquisition unit is configured to acquire a plurality of tomographic images including an anterior chamber angle, the plurality of tomographic images being obtained by radial scan with a position as a center that substantially matches a corneal vertex;

the analysis unit is configured to specify a position of a scleral spur from each tomographic image of the plurality of tomographic images, and obtain, as an analysis value, at least one of a distance, an angle, and an area between a cornea and an iris at a predetermined position, the position being based on the specified position of the scleral spur set in the tomographic image;

the analysis unit is configured to classify the anterior chamber angle obtained at each rotation angle into a plurality of anterior chamber angle levels that are set according to a size of the anterior chamber angle, based on a preset threshold value of the analysis value and the analysis value;

the front image acquisition unit is configured to acquire a photographed front image of an anterior eye segment; and the display processing unit is configured to cause a display to display the front image, and cause a mark in a color indicating an anterior chamber angle level to be superimposed and displayed at a position corresponding to a position of the scleral spur set in the tomographic image at a position in the front image corresponding to each rotation angle at which the anterior chamber angle is obtained and in a radial direction extending from the center.

2. The tomographic image processing device according to claim 1, wherein
the threshold value is determined based on the analysis values obtained in a plurality of eyes at an open angle.

3. The tomographic image processing device according to claim 1, further comprising:
a reception unit configured to receive a correction instruction of the position of the scleral spur in the tomographic image; wherein
the processor functions as the reception unit by executing the program,
the analysis unit is configured to obtain the distance based on the position of the scleral spur after correction according to the correction instruction, and specifies the anterior chamber angle level corresponding to the obtained distance; and
the display processing unit is configured to cause the mark in a color indicating the anterior chamber angle level specified based on the position of the scleral spur after correction to be displayed at the position of the scleral spur after the correction.

4. The tomographic image processing device according to claim 1, wherein
the display processing unit is configured to display the tomographic image in which the distance corresponding to the mark is obtained in a case where the mark is selected.

5. The tomographic image processing device according to claim 1, wherein
the threshold value is determined for every rotation angle.

6. The tomographic image processing device according to claim 1, wherein
at least two values of the threshold value are defined according to brightness of a surrounding environment; and
the analysis unit is configured to classify the anterior chamber angle into a plurality of the anterior chamber angle levels using the set threshold value of the at least two values.

7. The tomographic image processing device according to claim 1, wherein
the analysis unit is configured to obtain a comprehensive evaluation value that is a ratio at which the specific anterior chamber angle level is obtained among the anterior chamber angles corresponding to all the measurement positions and
the display processing unit is configured to display the comprehensive evaluation value.

8. The tomographic image processing device according to claim 1, wherein
the display processing unit is configured to display a circular chart corresponding to an anterior eye segment, and is configured to display the analysis value and a preset threshold value of the analysis value along an axis indicating the distance set in a radial direction at a position in a circumferential direction of the chart corresponding to each rotation angle at which the distance is obtained.

9. The tomographic image processing device according to claim 8, wherein
the display processing unit is configured to display a range corresponding to the rotation angle at which the anterior chamber angle level is obtained in the chart with a color indicating the anterior chamber angle level.

10. A non-transitory computer-readable medium storing a program for causing a computer to execute following steps:
a tomographic image acquisition step of acquiring a plurality of tomographic images including an anterior chamber angle, the tomographic images being obtained by radial scan with a position as a center that substantially matches a corneal vertex;
an analysis step of specifying a position of a scleral spur from each tomographic image of the plurality of tomographic images, obtaining, as an analysis value, at least one of a distance, an angle, and an area between a cornea and an iris at a predetermined position, the position being based on the specified position of the scleral spur set in the tomographic image, and classifying the anterior chamber angle obtained at each rotation angle into a plurality of anterior chamber angle levels that are set according to a size of the anterior chamber angle, based on a preset threshold value of the analysis value and the analysis value;
a front image acquisition step acquiring a photographed front image of an anterior eye segment; and
a display processing step causing a display to display the front image, and causing a mark in a color indicating the anterior chamber angle level to be superimposed and displayed at a position corresponding to a position of the scleral spur set in the tomographic image at a position in the front image corresponding to each rotation angle at which the anterior chamber angle is obtained and in a radial direction extending from the center.

* * * * *